United States Patent [19]
Rahlfs et al.

[11] 3,976,411
[45] Aug. 24, 1976

[54] APPARATUS FOR CALIBRATING SYNTHETIC-RESIN TUBING

[75] Inventors: Herbert Rahlfs, Troisdorf-Sieglar; Udo Hardt, Eitorf, both of Germany

[73] Assignee: Reifenhauser KG, Troisdorf, Germany

[22] Filed: Dec. 17, 1975

[21] Appl. No.: 641,361

[30] Foreign Application Priority Data
Dec. 18, 1974 Germany............................ 2459785

[52] U.S. Cl. .......................... 425/72 R; 425/326 R; 425/466
[51] Int. Cl.² ......................................... B29D 23/04
[58] Field of Search ................... 425/72, 326 R, 466

[56] References Cited
UNITED STATES PATENTS

| | | | |
|---|---|---|---|
| 3,210,803 | 10/1965 | Najar | 425/72 |
| 3,507,006 | 4/1970 | Princen | 425/72 |
| 3,775,523 | 11/1973 | Haleg | 425/72 X |
| 3,819,790 | 6/1974 | North et al. | 425/72 X |
| 3,898,028 | 8/1975 | Upmeier | 425/326 R |

*Primary Examiner*—Robert L. Spicer, Jr.
*Attorney, Agent, or Firm*—Karl F. Ross; Herbert Dubno

[57] ABSTRACT

An apparatus for calibrating synthetic-resin tubing issuing continuously from a nozzle comprises an inner relatively long tube extending downstream from the nozzle and connected to an exhaust pump. A shorter outer tube surrounds this inner tube and defines therewith an annular chamber. A plurality of axially spaced disks of like outside diameter are carried on this outer tube and the compartments defined between these disks communicate with the annular chamber through holes formed through the outer tube. These holes as well as axially throughgoing holes in the disks are of adjustable flow cross section for aerodynamically balancing the air flow within the tubing as it emerges from the extruder. Thus air injected into the tubing adjacent the nozzle can flow up around the disks, between the compartments of the disks, and from each of these compartments into the annular chamber, to be eventually sucked out through the relatively long tube at the center of the apparatus.

11 Claims, 5 Drawing Figures

APPARATUS FOR CALIBRATING SYNTHETIC-RESIN TUBING

FIELD OF THE INVENTION

The present invention relates to the extrusion of tubing. More particularly this invention concerns an apparatus for shaping synthetic-resin tubing as it issues from an extruder nozzle.

BACKGROUND OF THE INVENTION

Synthetic-resin and similar tubing is usually formed by an extrusion machine having a head with an annular nozzle orifice from which the tubing issues continuously. Secured to this nozzle is a cooling device having a central exhaust tube whose downstream end is surrounded by an axially spaced group of transverse calibrating disks and by an annular exhaust passage which communicates with the compartments between the calibrating disks. In addition cool-air jets are provided at the annular nozzle from which this tubing issues to cool and harden the tubing.

In most known constructions the calibrating disks are hollow and have outwardly directed lips defining cool-air outlets. The interiors of the hollow calibrating disks are connected with a source of cooled air, usually to the same manifold that supplies the above-mentioned cooling air jets. In this manner an attempt is made to obtain even cool-air distribution between the various calibrating rings.

Such an arrangement has the disadvantage that it is very difficult to vary the aerodynamic relationships for the cooling. In particular it is impossible to balance the flow from calibrating ring to calibrating ring. Thus it is extremely difficult, if not impossible, accurately to shape the tubing at the cooling device. More particularly the calibration, that is the shaping of the tubing with an exactly controlled inner diameter, is only possible by removal of the calibrating rings and replacement of them with differently constructed rings. Thus the prior-art devices are manufactured to produce a given type of tubing, using a given synthetic-resin at a given temperature and pressure, and are not usable for different types of tubing, different resins or different extrusion conditions.

OBJECTS OF THE INVENTION

It is therefore an object of the present invention to provide an improved apparatus for shaping plastic tubing.

Another object is the provision of an improved cooling device for shaping synthetic-resin tubing issuing continuously from a nozzle.

Yet another object is to provide such a shaping apparatus which can be readily and easily adapted for different calibers of tubing, different types of resin, and different operating temperatures and speeds.

SUMMARY OF THE INVENTION

These objects are attained according to the present invention in a shaping apparatus of the above-described general type which allows balancing of the aerodynamic relationships from disk to disk by providing separate shutters for each array of holes through the exhaust tube. Thus the flow from each of the compartments formed between the calibrating disks into the interior of the exhaust tube may be individually controlled. The flow cross-section of these holes may be varied from compartment to compartment in order to obtain very exactly aerodynamically balanced flow.

According to another feature of this invention the disks themselves are formed with throughgoing holes allowing fluid flow from compartment to compartment. These holes are also provided with independently adjustable shutters so that this flow from compartment to compartment may also be individually controlled. Thus these disks are formed as diaphragm plates.

With the system according to the present invention the dynamic and static pressure can be controlled. Thus the cooling effect is optimized while the calibration is achieved which does not rely on mechanical tools, as in the prior-art arrangements where the inner diameter or caliber of the tubing is directly dependent on the diameters of the calibrating disks. With the arrangement according to this invention the temperature and extrusion rate of the tubing can be varied and compensated for very easily, without the necessity of replacing major elements in the cooling device.

In accordance with this invention the shutters are formed by apertured plates overlying the respective element, tube or calibrating disk, and having apertures of the same size and relative position as the holes in this element. This aperture plate can be positioned with the holes directly in line for maximum flow cross section, or can be offset to the respective element in order to reduce the flow cross section. Means is provided for securing the aperture plate in any position relative to the respective element so as to achieve continuous adjustability. The element overlying each array of holes in the tube is a sleeve snugly surrounding the tube and securable thereto by at least one screw engaging through a slot in the apertured element and screwed into the tube. The disk aperture plate is itself an annular disk similarly bolted through at least one arcuate slot to the respective disk.

According to further features of this invention the exhaust tube is constituted by concentric inner and outer tubes, the inner tube being more than twice as long as the outer tube. The disks are carried on the outer tube and the holes are formed therein so that there is formed between the inner and outer tubes a cylindrical annular compartment opening downstream. Both of the tubes are cylindrical and the disks are of circular outer periphery. The holes through the disks are provided on the inner peripheries of these disks directly against the outer tube. The holes through this outer tube are spaced slightly closer to the upstream disk than to the respective downstream disk.

The means for feeding cooling gas in accordance with this invention comprises an array of radially open nozzles that direct respective currents of air generally transverse to the tube direction against the tubing directly as it emerges from the nozzle. Another array of nozzles is provided outside the arrangement for directing cool air inwardly against the extruding tube.

SPECIFIC DESCRIPTION

Figure 1:
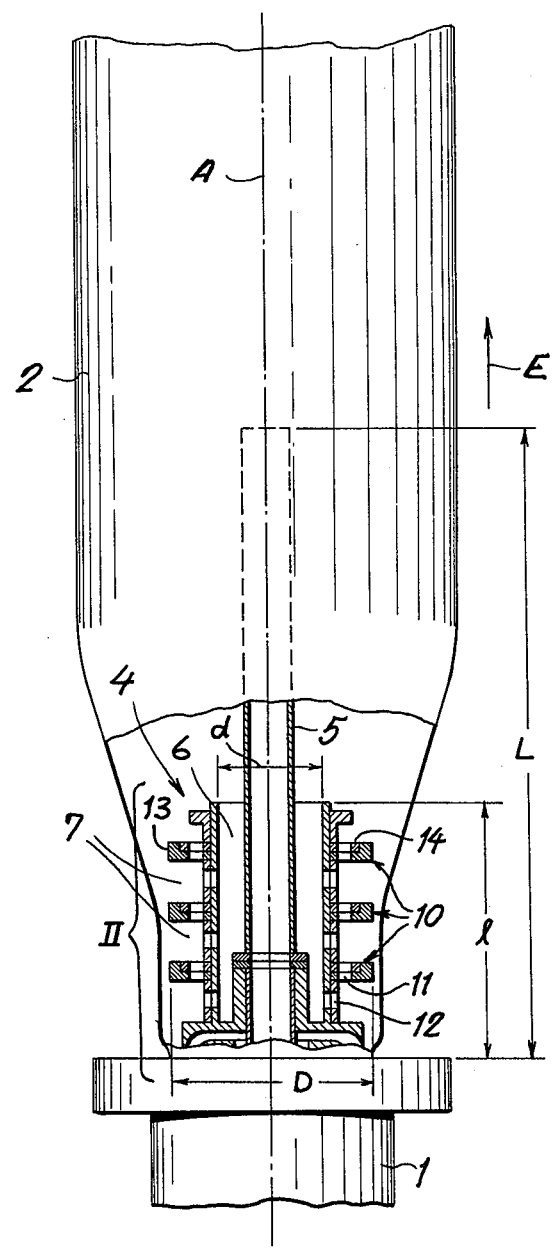
FIG. 1 is a side partly sectional view of the apparatus according to this invention.
Figure 2:
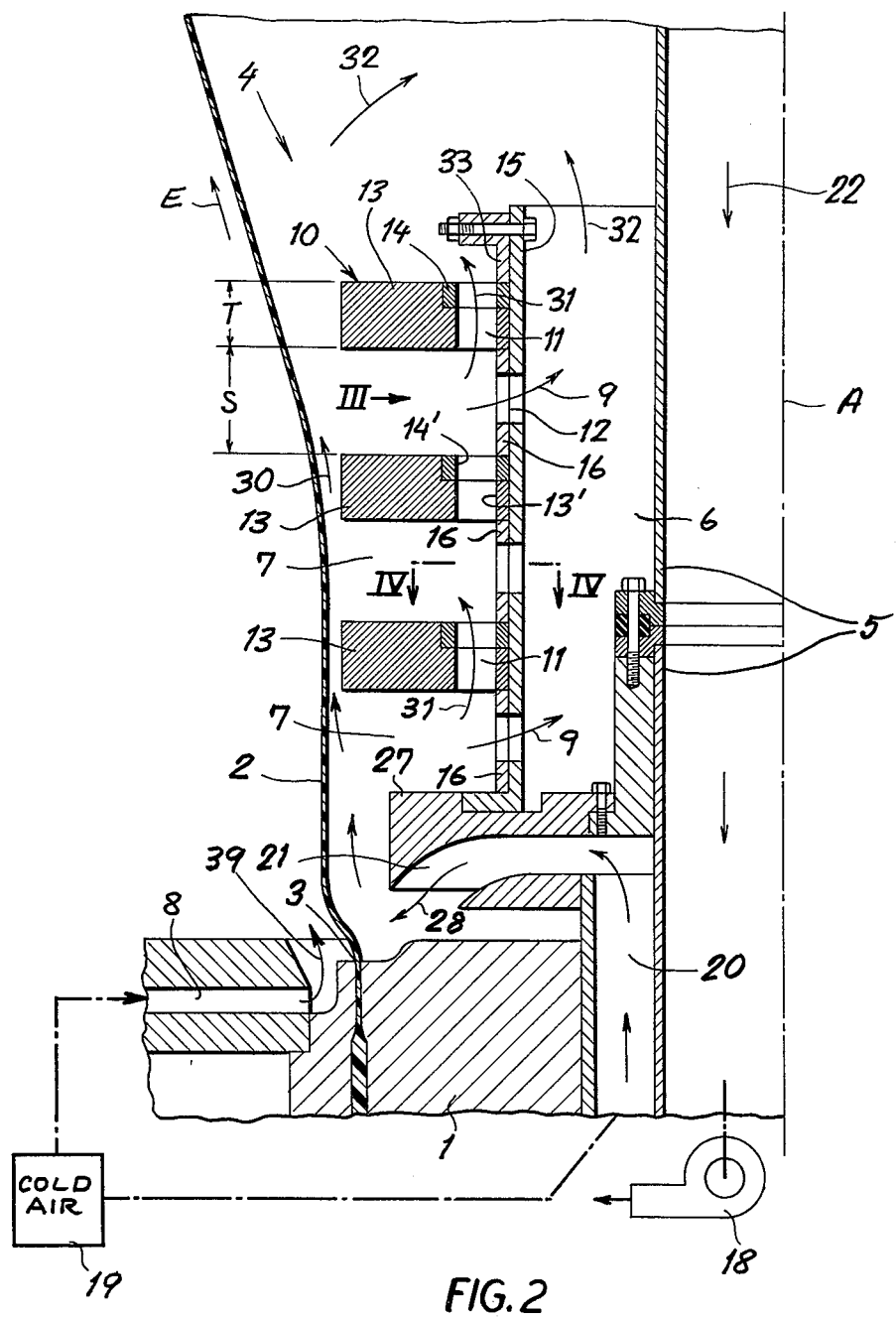
FIG. 2 is a large-scale view of the detail of FIG. 1 indicated at II.

The arrangement shown in FIGS. 1 and 2 is adapted to shape tubing 2 continuously extruded from the circularly annular orifice 3 of the head 1 of an extrusion molding machine, with tube 2 being emitted in a direction as indicated at arrow E centered on an axis A. A cooling arrangement 4 comprising a central exhaust tube 5 is centered on the axis A and has an overall length L above the nozzle 1. A blower 18 connected to the interior of this tube 5 serves to aspirate air out of it as indicated by arrow 22.

Surrounding the lower end of tube 5 is another tube 15 having a length $l$ equal to less than 0.5 L, here 0.4 L, and defining an annular generally cylindrical chamber 6 with the tube 5. Carried on this tube 15 are three planar disks 10 having outer diameter D greater than the inside diameter $d$ of the tube 15 by a factor of approximately 2. These disks 13 are planar and perpendicular to the axis A on which the tubes 15 and 5 are centered and have an axial spacing S equal to substantially more than their axial thickness T. The tube 15 is formed with arrays of radially equispaced holes 12 immediately downstream in the direction E of each of the disks 10. In addition the disks 10 are formed with annular arrays of holes 11, each hole 11 being axially aligned with the respective hole 12.

At its end immediately adjacent the extruding nozzle 1 the tube 5 is provided with an element 27 formed with a plurality of radially outwardly opening holes 21 connected to a manifold 20 and a cold-air blower 19. This allows cold air to be injected into the extreme upstream end of the interior of the tube 2 as indicated by arrow 28. In addition nozzles 8 are connected to the cold-air source 19 for directing a flow of cold air against the outside of the tubing immediately adjacent the nozzle opening as indicated by arrow 29.

Thus in use the cold-air source 19 is operated to direct air against the tubing 2 issuing from the die 1 as indicated by arrows 28 and 29. The air within the tube flows up in the direction of extrusion of the tube and passes partially outside the disks as indicated by arrows 30, partially between the compartments 7 of the tube as indicated by arrows 31, and partially from the compartments 7 through the holes 12 into the interior 6 of the tube 15 as indicated by arrows 9. Thereafter the air passes up as shown by arrows 32 and eventually reverses direction, being sucked down into the central tube 5 as indicated by arrow 22 into the blower 18.

Figure 3:
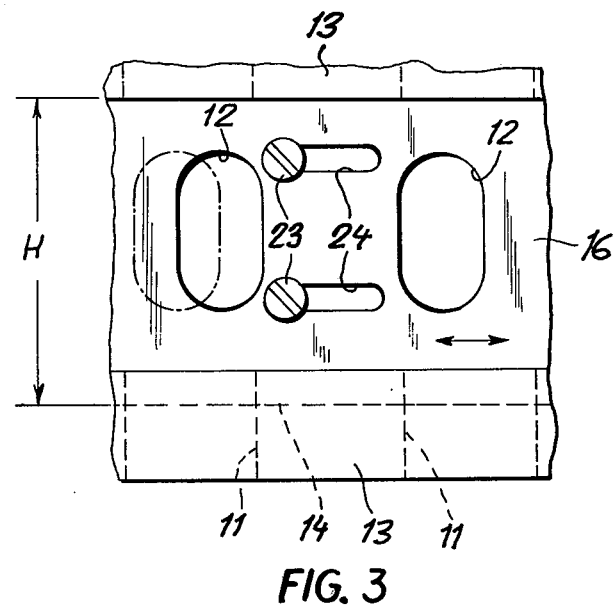
FIG. 3 is a large-scale view of the detail indicated at at arrow III of FIG. 2.
Figure 4:
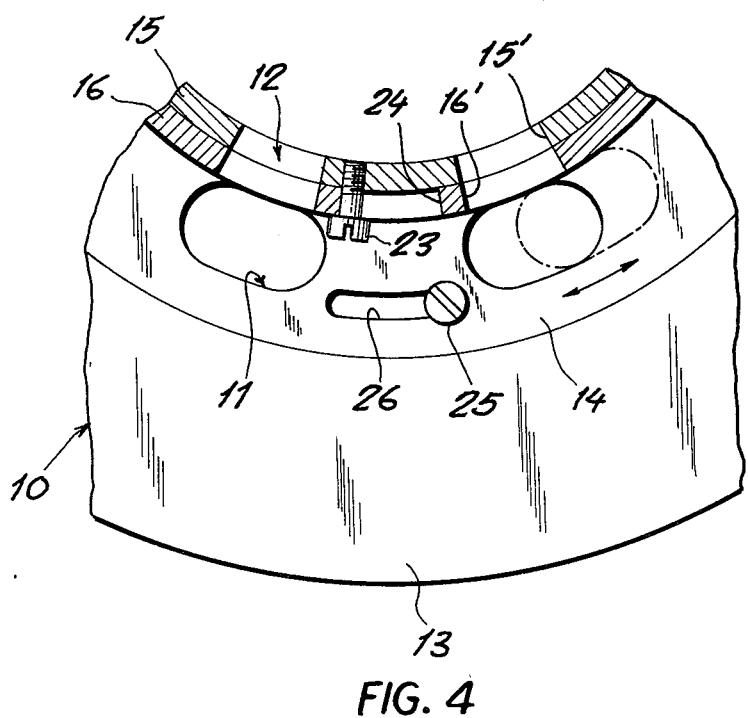
FIG. 4 is a section taken along line IV—IV of FIG. 3.

The tube 15 is surrounded over each of its array of holes 12 by a sleeve 16 illustrated in FIG. 3 and formed with oblong holes 16' that align with identical holes 15' in the tube 15 to form the throughgoing holes 12. Each of these sleeves 16 is formed with a pair of slots 24 through which are engaged screws 23 threaded into the inner tube 15. This allows the sleeves 16 to be rotated relative to the tubes 15, thereby offsetting the holes 15' and 16' and varying the flow cross section of the holes 12.

In addition each of the disks 10 is formed of a disk 13 rigidly secured to the inner tube 15 and another disk 14 rotatable relative to the disk 13 and the tube 15. Each of the disks 13 has oblong throughgoing holes 13' that are alignable with identical holes 14' in the disks 14 that together constitute the throughgoing holes 11. In addition each disk 14 is formed with an arcuate slot 26 through which a screw 25 passes, this screw being threaded into the respective disk 13 so as to allow the holes 13' and 14' to be offset relative to one another to vary the flow-cross section through the holes 11.

It is noted that the disks 14 are inset in the respective disks 13 and rendered axially nondisplaceable by means of the disks 16 or an end flange 33 screwed to the element 15. In addition the rings 16 have an overall height H slightly greater than the spacing S so that they are firmly seated in the arrangement and can only rotate relative to the tube 15 which itself is securely bolted to the nozzle plate 27 secured on the tube 5.

It lies within the scope of this invention to make the inner tube 15 rotatable and the outer tube 16 nonrotatable. With the illustrated arrangement the entire assembly is held together by the flange element 33, so that removal of this element 33 readily allows all of the parts 13, 14, and 16 to be slipped off the upper end of the tube 15. This allows any of the rings 14 or 16 to be replaced with unperforated rings if desired.

Figure 5:
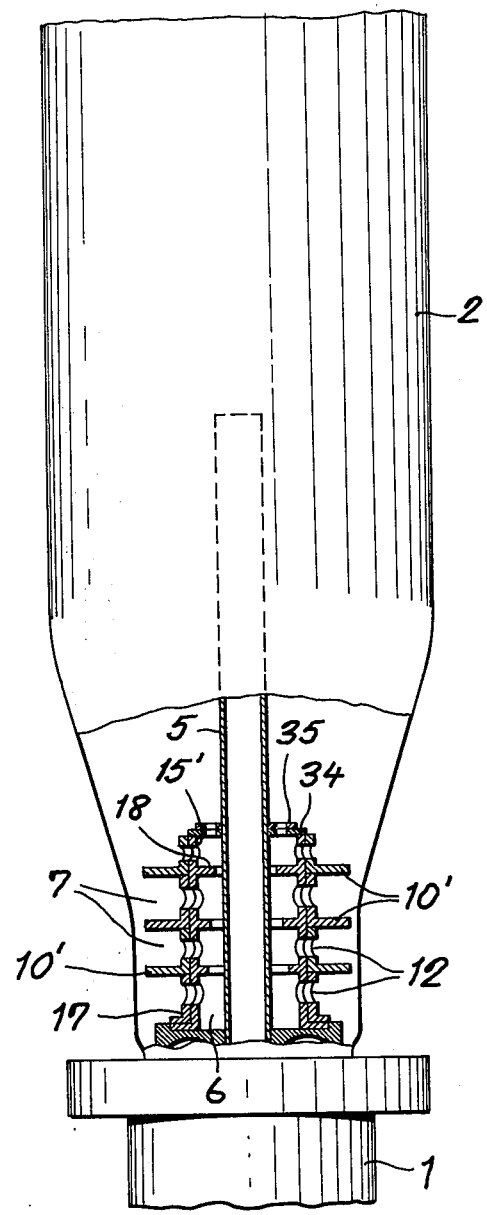
FIG. 5 is a view similar to FIG. 1 showing another arrangement in accordance with this invention.

The arrangement in FIG. 5 uses the same reference numerals for a structure functionally identical to that in FIGS. 1 – 4. In this arrangement the plates 10' are not themselves perforated but are each unitarily formed with respective sleeves 17 having apertures functionally identical to the apertures 16'. The inner tube 15' is formed with inwardly extending baffles 18 of increasingly smaller internal diameter in a direction away from the nozzle 1. The upper end of the tube 15' is closed by a pair of perforated plates 34 and 35 functionally similar to the plates 13 and 14 and having similarly adjustable orifices. The plates 10' are not formed with axially directed throughgoing perforations. Nozzle or slot 8 issues cooling air around the tubing 2.

We claim:

1. An apparatus for shaping synthetic-resin tubing issuing continuously from a nozzle, said apparatus comprising:
   means for withdrawing gas from the interior of said tubing at a location spaced downstream from said nozzle;
   an elongated tube in said tubing extending downstream from said nozzle and terminating upstream of said location to define an elongated chamber opening downstream, said tube being formed with a plurality of longitudinally spaced arrays of throughgoing holes;
   a plurality of transverse calibrating disks each secured to said tube immediately downstream of a respective one of said arrays and each forming with the next upstream disk a compartment communicating with said chamber through the respective array of holes;
   means including a plurality of independently adjustable shutters for varying the flow cross-section of said holes and thereby controlling fluid flow between said compartments and said chamber; and
   means for introducing a cooling gas into said tubing at said nozzle, whereby said cooling gas contacts said tubing and passes downstream around said disks and through said compartments and chamber to be aspirated at said location.

2. The apparatus defined in claim 1 wherein said disks are each formed with an array of throughgoing holes, said apparatus including means having a plurality of independently adjustable shutters for varying the flow cross-section of said holes of said disks and thereby controlling fluid flow between adjacent compartments.

3. The apparatus defined in claim 2 wherein said shutters of said disks are each a plate formed with an array of holes alignable with the holes of the respective disk, said means for varying the cross-section of said holes of said disks including means for displacement of each plate relative to the respective disk and for securing each plate to the respective disk in a position with the holes of said plate and of said disk offset.

4. The apparatus defined in claim 3 wherein each disk is annularly circular and each plate is annularly circular and recessed in the respective disk.

5. The apparatus defined in claim 1 wherein each of said shutters is a sleeve rotatable on said tube at the respective array and having an array of holes registrable with the respective array of holes of the tube, said means for varying including means for securing each sleeve nonrotatably to said tube with the holes of said sleeve and of said tube offset.

6. The apparatus defined in claim 5 wherein each sleeve is formed with a slot, said means for securing including a screw threaded into said tube and passing through said slot.

7. The apparatus defined in claim 5 wherein said tube lies within said sleeves and is secured to said nozzle.

8. The apparatus defined in claim 7 wherein said tube is cylindrical and has a central longitudinal axis, said disks being circularly annular and centered on and perpendicular to said axis.

9. The apparatus defined in claim 8 wherein said tube includes a long inner tube extending from said nozzle to said location and a short outer tube carrying said disks and of a length substantially less than said inner tube.

10. The apparatus defined in claim 1 wherein said shutters are each a sleeve surrounding said tube at the respective array and formed with an array of holes alignable with the respective array of holes of said tube, said disks each being unitary with a respective sleeve.

11. The apparatus defined in claim 1, further comprising an annular slot surrounding said nozzle for directing cooling gas against said tubing as same issues from said nozzle.

* * * * *